United States Patent [19]
Ashida et al.

[11] 3,981,570
[45] Sept. 21, 1976

[54] MOTION PICTURE PROJECTOR DEVICE AS AUDIO-VISUAL AID AND AUDIO-VISUAL SYSTEM USING THE SAME

[75] Inventors: Akira Ashida, Tokyo; Kiyoshi Takahashi, Kunitachi, both of Japan

[73] Assignee: Canon Kabushiki Kaisha, Tokyo, Japan

[22] Filed: June 3, 1974

[21] Appl. No.: 476,107

[30] Foreign Application Priority Data

June 8, 1973 Japan.............................. 48-64478
June 8, 1973 Japan.............................. 48-64481
June 8, 1973 Japan.............................. 48-64479

[52] U.S. Cl..................................... 352/12; 352/5; 352/27; 352/37; 352/169
[51] Int. Cl.²........................................ G03B 31/00
[58] Field of Search............. 352/12, 17, 27, 5, 169, 352/137, 37

[56] References Cited
UNITED STATES PATENTS

| | | | |
|---|---|---|---|
| 2,606,476 | 8/1952 | Waller | 352/17 |
| 3,432,228 | 3/1969 | Hellmund | 352/169 |
| 3,452,161 | 6/1969 | Hafler | 352/37 X |
| 3,687,529 | 8/1972 | Goshima | 352/27 |

*Primary Examiner*—Monroe H. Hayes
*Attorney, Agent, or Firm*—Fitzpatrick, Cella, Harper & Scinto

[57] ABSTRACT

This specification discloses a motion picture projector device as audio-visual aid and an audio-visual system using the same. The device uses a film structure including an image information recording zone, a row of perforations along one side edge of the film, and a balance zone juxtaposed with said row of perforations along the one side edge of the film and having various signals recorded thereon in a straight line. These signals include a non-normal projection mode speech information signal, a transfer instruction signal for instructing the transfer of said non-normal projection mode speech signal to a record information member, a transfer stop instruction signal for stopping the transfer, and a reproduce instruction signal for instructing a reproduce mechanism to reproduce the non-normal projection mode speech information signal transferred to said record member. The film structure further includes, on the other side edge thereof, a normal projection mode speech information recording zone which may be reproduced by another reproduce mechanism during normal projection mode. The signals recorded on the balance zone of the audio-visual film structure may be transferred to said record information member during normal projection mode. The signals transferred to the record information member may be reproduced during non-normal projection mode.

7 Claims, 16 Drawing Figures

MOTION PICTURE PROJECTOR DEVICE AS AUDIO-VISUAL AID AND AUDIO-VISUAL SYSTEM USING THE SAME

BACKGROUND OF THE INVENTION

1. Field of the Invention

This invention relates to a motion picture projector device for use as audio-visual aid and to a system therefor.

2. Description of the Prior Art

With a motion picture device used as audio-visual aid in education or the like, it is generally often the case that, when a particular scene in the film is come across during projection, the mode of projection is changed over to still projection, slow motion projection or the like in order to explain the particular scene in detail. However, with a motion picture projector device capable of reproducing images and speech at one time, speech reproduction is effected by a magnetic head, an optical detector member, etc. picking up the speech information recorded on one side edge of the film and by reproduce means reproducing the picked-up speech signal into sound. Such magnetic head or optical detector member for reproducing the speech information are usually fixedly disposed in the path of the film and, when the film traverses the magnetic head or optical detector member, the speech information recorded in the successive portions of the film is sequentially read by the magnetic head or optical detector member to effect the speech reproduction. Therefore, when from still projection takes place, the film stops from moving and it becomes impossible to provide speech reproduction from the film. To overcome this, speech reproduction during still projection has heretofore been done by pre-recording the speech information for still projection mode with a tape recorder or like device and by operating such tape recorder or the like during the still projection to have the pre-recorded speech information reproduced by the tape recorder or the like. Such system has thus required a separate speech reproduce device in addition to the speech reproduce device contained within the motion picture projector device, which in turn has meant not only increased cost and increased procedures of operation but also required greater care to be taken in the keeping of more than one equipment. Moreover, during slow motion projection, any extreme drop of the film feeding speed would so much decline the quality of the sound as reproduced by the cooperation between the speech information recorded in one side edge of the film and the magnetic head or the like that the speech might be aurally incomprehensible. For such reason, the speech reproduction during slow motion projection mode must resort to a system similar to the above-described system employed during still projection mode, that is, the speech information for the slow motion projection mode must be pre-recorded with a separate tape recorder or the like and such tape recorder must be operated to reproduce the pre-recorded speech information during the slow motion projection.

SUMMARY OF THE INVENTION

In view of the above-described problems existing in the prior art, a first object of the present invention is to provide a motion picture projector device and a system therefor which device eliminates the separate accessory equipment and which singly can reproduce normal sound even during any other projection mode than the normal projection mode, e.g. during still projection mode or slow motion projection mode.

It is a second object of the present invention to provide a motion picture projector device which can reproduce normal sound irrespective of the normal or the non-normal projection mode by using an endless film contained within a cartridge and provided with various types of record information on the opposite side edges of the film. More specifically, on one side edge of the endless film are provided speech information signals to be delivered to a speech reproduce circuit for speech reproduction during normal projection mode, and on the other side edge of the endless film are provided information signals to be delivered to a control circuit for controlling the film feeding speed so that changeover may occur from normal projection mode to non-normal projection mode or vice versa, non-normal projection mode speech information signals pre-transferable onto a separate record information member so that the necessary speech information may be provided from such record member during non-normal projection mode, and information signals for instructing the transfer means to effect the transfer of the non-normal projection mode speech information signals to the record information member. During normal projection mode, the speech information provided on the film may be reproduced, and during non-normal projection mode, the speech information recorded during the normal projection mode on the record information member rotatable at a speed equal to the speed of the moving film may be reproduced.

Other objects and features of the present invention will become fully apparent from the following detailed description taken in conjunction with the accompanying drawings.

DESCRIPTION OF THE PREFERRED EMBODIMENTS

Figure 1:
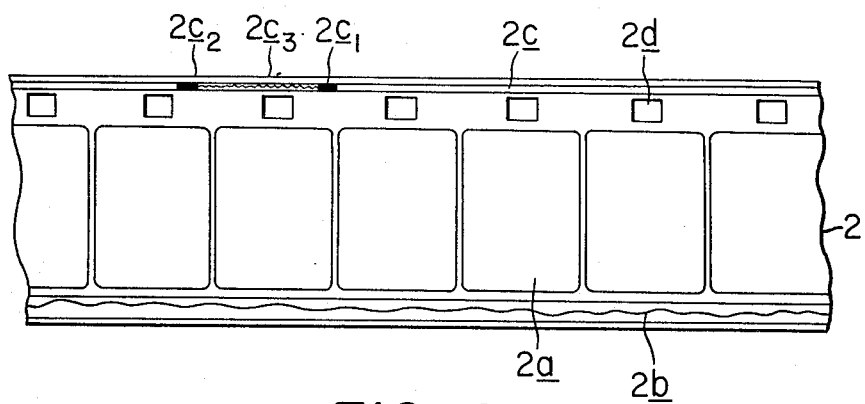
FIG. 1 is a fragmentary plan view showing a form of film used with the motion picture projector device according to the present invention.

FIG. 1 shows a portion of film 2 used with the motion picture projector device and the system therefor according to the present invention. The film 2 includes an image information recording zone 2a devided into a series of frames, a speech information signal recording zone 2b for normal projection mode, an auxiliary information signal recording zone 2c provided in the balance zone of the film, and perforations 2d engageable by a film feed pawl to permit a predetermined amount of the speech information recording zone 2b to be intermittently fed to a film gate portion. On the auxiliary information signal recording zone 2c, there are provided various types of information such as speech record information $2c_3$ identical with the speech record information provided from a later-described record information member during any other projection mode than normal projection mode, record information $2c_1$ generating a signal for controlling a later-described record information member for transferring the speech record information $2c_3$ to the record information member, and record information $2c_2$ generating a signal for interrupting the transfer of the speech record information $2c_3$ to the record information member and a signal for interrupting the detection of the signal recorded in the record information member.

Figure 2:
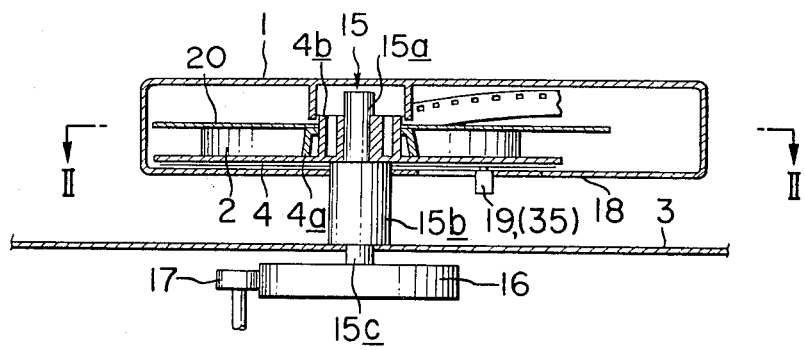
FIG. 2 is a front sectional view of essential portions of the motion picture projector device and illustrating the details of the endless cartridge used with the device of the present invention, means for feeding the film in the cartridge to a film gate portion, and means for effecting the projection.
Figure 3:
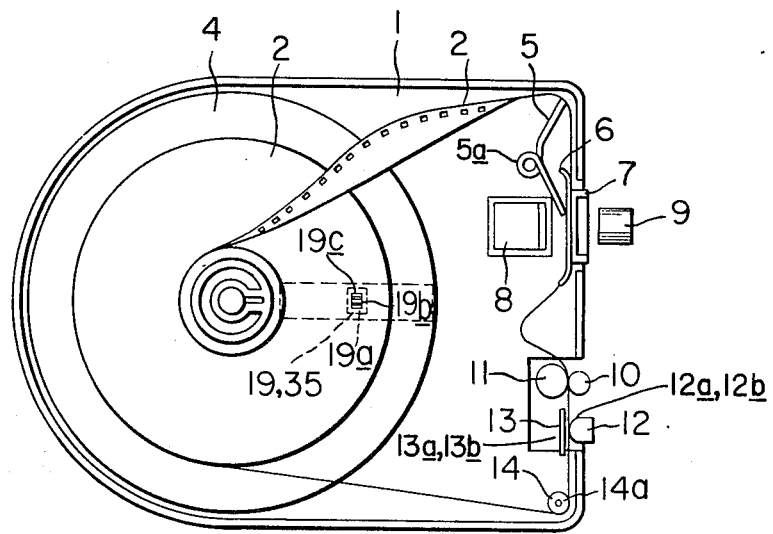
FIG. 3 is a plan view of the endless cartridge taken in the direction of arrows II—II in FIG. 2, with the upper housing portion of the cartridge being removed.

FIGS. 2 and 3 show details of the endless cartridge used with the motion picture projector device and the system therefor according to the present invention and schematically illustrates means for feeding the film within the endless cartridge to the film gate portion and means for effecting the projection.

In these figures, there is seen an apertured plate 7, reflector 8, projection lens 9, capstan 10, pinch roller 11, speech reproduce heads 12 and 19, pad 13, drive shaft 15, flywheel 16, and prime moving friction wheel 17 driven from a motor, not shown, and these are the members pertaining to the motion picture projector device. The speech reproduce head 12 comprises a detector member 12a adapted to bear against the normal projection mode speech information signal recording zone 2b of the film 2 to detect the information in such zone 2b, and a detector member 12b adapted to bear against the auxiliary signal recording zone 2c of the film 2 to detect the information $2c_1$, $2c_2$, $2c_3$ in such zone 2c. The pad 13 is disposed to correspond to the speech reproduce head 12 so as to hold the film 2 therebetween and comprise portions 13a and 13b corresponding to the detector members 12a and 12b respectively. The speech reproduce head 19 comprises a detector member 19a for detecting the speech information recorded in the record information member, an eraser member 19b for erasing the speech information recorded in the record information member, and a recording member 19c for causing the speech record information $2c_3$ in the auxiliary information signal recording zone 2c to be transferred to the record information member by a later-described means.

A pressure plate 6 disposed within the endless cartridge which will later be described, the apertured plate 7, reflector 8 and projection lens 9 together constitute the film gate portion. Although not shown in the present embodiment, film feed means as described in Japanese Patent Publication No. 26021/1965 is used to intermittently feed the film 2 to the apertured plate 7, where the film surface is illuminated by the light emitted from a light source (not shown) and the light is reflected by the reflector 8 so that the image of the film 2 is projected through the projection lens 9 onto a screen (not shown). During the projection, the capstan 10 coupled to an unshown motor shaft and the pinch roller 11 are in pressure contact with each other with the film 2 nipped therebetween, thus constituting second film feed means for the film 2. Upon the projection being discontinued, the capstan and the pinch roller may be released from such pressure contact by outside operation. The drive shaft 15 comprises a mating shaft portion 15a mating with the hollow of the spindle 4a of the later-described endless cartridge, a spacer portion 15b for maintaining a spacing between the endless cartridge and the outer frame of the projector device, and a mating shaft portion 15c mating with the flywheel 16. The drive shaft 15 is rotatably journalled to the base plate 3 of the projector device.

The endless cartridge will now be described in particular.

The cartridge housing is designated by 1 and comprises a combination of an upper housing portion A and a lower housing portion B.

Figure 4A:
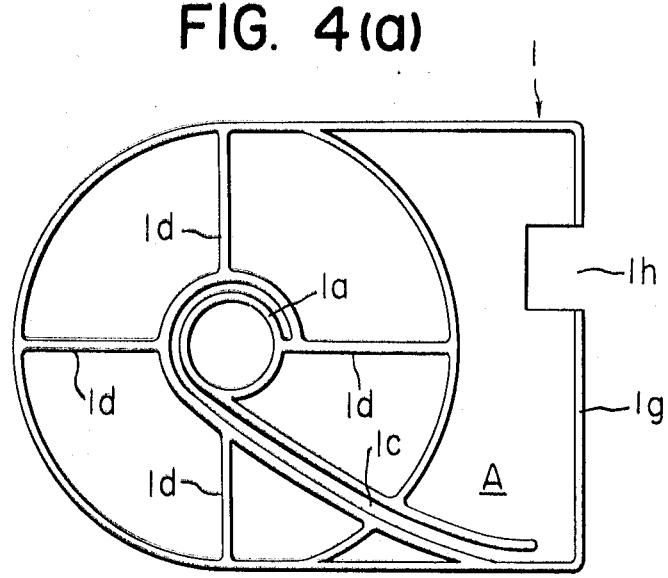
FIG. 4(a) is a plan view showing the details of the upper housing portion of the endless cartridge shown in FIGS. 2 to 3.

As is shown in FIG. 4(a), the upper housing portion A includes therewithin an inwardly projected hollow projection 1a, a film guide groove 1c for guiding the film 2 (not shown) as it is paid away, and radial limit frames 1d for limiting the film 2 so as to be wound snugly in a common plane, and also includes, outside the outer housing frame portion, a cut-away portion 1g for permitting admission of a member forming the film gate, a cut-away portion 1h for permitting admission of the second film feed means provided by the capstan 10 and pinch roller 11 and admission of the speech reproduce head 12.

Figure 4B:
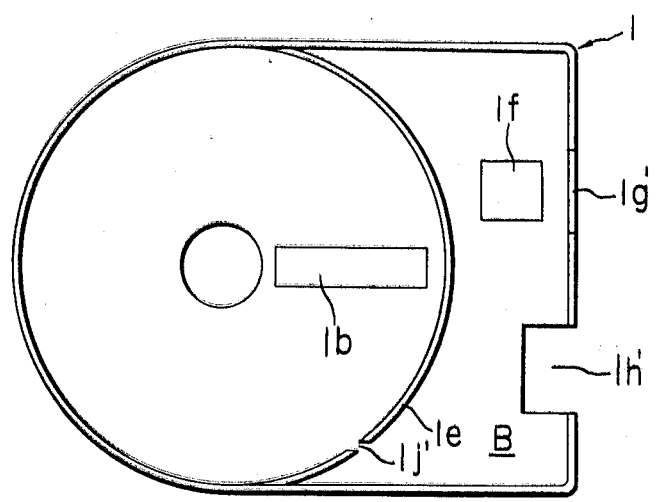
FIG. 4(b) is a plan view showing the details of the lower housing portion of the same endless cartridge.

As is shown in FIG. 4(b), the lower housing portion B includes therewithin an inwardly projected limit frame 1e provided with a film inlet 1j for limiting the floating movement of the outer portion of the endless film 2 (not shown), and also includes, outside the outer housing frame portion, an opening 1b for permitting admission of the speech reproduce head 19 for the purpose to be described, an opening 1f for permitting admission of the reflector 8 of the projector device, and cut-away portions 1g' and 1h' corresponding to the cut-away portions 1g and 1h of the upper housing portion A.

A turn table 4 as shown in FIGS. 2 and 3 is disposed within the cartridge housing 1 and has an integral spindle 4a formed centrally thereof for winding thereon the endless film 2. The spindle 4a is mated with the drive shaft 15a for rotation with the latter.

Figure 6:
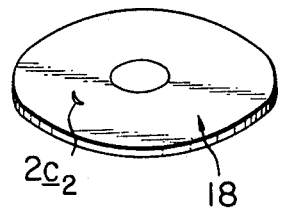
FIG. 6 is a perspective view of the magnetic sheet 18 attached to the back side of the turn table 4 on which auxiliary speech information signal 2c of the film 2 may be recorded.

On the surface of the turn table opposite to that surface on which the endless film 2 is wound, there is attached a magnetic sheet 18 capable of recording speech information, as shown in FIGS. 2 and 6.

A damper 5 shown in FIG. 3 is fixed to the cartridge housing 1 by means of a pin 5a, and a guide roller 14 is rotatably journalled to the cartridge housing 1 by means of a pin 14a. The damper and the guide roller both serve to guide the film 2 as it is fed.

When the endless cartridge of the above-described construction has been set in the projector device, the film 2 is drawn from the inner layer of the endless film supply 2 wound in a common plane on the turn table 4 within the cartridge housing 1 and fed past the damper 5 to the film gate portion, where the light from the light source illuminates the film 2 with the aid of the reflector 8 to project the image information 2a of the film 2 through the projection lens 9 onto the screen. The film 2 is further fed intermittently by unshown drive means, whereafter it forms a loop, and then it is continuously fed by the capstan 10 and pinch roller 11 to pass over the speech reproduce head 12 and the guide roller 14, whereafter the film can again wind onto the outer layer of the endless film supply 2. Under such conditions, when the drive circuit of the projector device is supplied with a current, the friction wheel 17 shown in FIG. 2 and the capstan 10 shown in FIG. 3 are rotated and the intermittent film feed means begins to intermittently feed the film 2. The rotation of the friction wheel 17 is transmitted through the fly-wheel 16 and drive shaft 15 to the turn table 4, which is thus rotated in clockwise direction. This clockwise rotation of the turn table 4 serves the purposes of reducing the feeding load imparted to the intermittent feeding mechanism when the film is fed to the film gate portion from the inner layer of the endless film supply 2 wound on the spindle 4a of the turn table 4, thereby permitting the film fed by the capstan 10 and pinch roller 11 forming the second film feeding mechanism to be wound onto the outer layer of the endless film supply 2, and causing a later-described means to record speech information on the magnetic sheet 18 provided on the back side of the turn table during non-normal projection mode so that such information may be detected at the same speed as the film feeding speed during the normal projection mode. Thus, the turn table 4 is designed such that it slips with respect to the contact surface of the endless film supply 2 when non-normal projection mode occurs, and it is always rotated at a constant speed.

Figure 5:
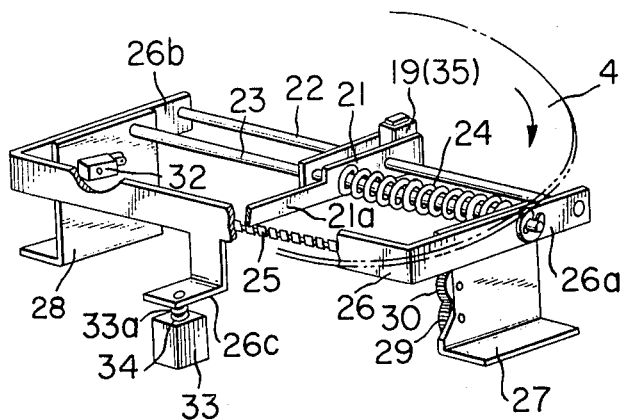
FIG. 5 shows, in perspective view, the mechanism for causing a speech reproduce head 19 to bear against a magnetic sheet 18 on a turn table 4 in order that the head 19 may record speech information on the magnetic sheet 18 and that the head 19 may detect the speech information signal so recorded on the magnetic sheet 18.

FIG. 5 schematically shows the mechanism by which the speech reproduce head 19 is caused to bear against the magnetic sheet 18 (not shown) on the turn table 4 to record speech information in the magnetic sheet 18 and to detect the speech information signals so recorded in the magnetic sheet. The mechanism includes an electromagnet 33 energized by a signal from a later-described means, and a lever 26 supported for pivotal movement about a shaft 23 on support members 27 and 28 secured to the projector device. The lever 26 holds a shaft 22 at the opposite ends 26a and 26b. The lever 26 has a downwardly extending projection 26c engaged with a connector member 33a attracted by the electromagnet 33 upon energization. A coil spring 34 is wound around the connector member 33a between the magnet 33 and the projection 26c.

Figure 7:
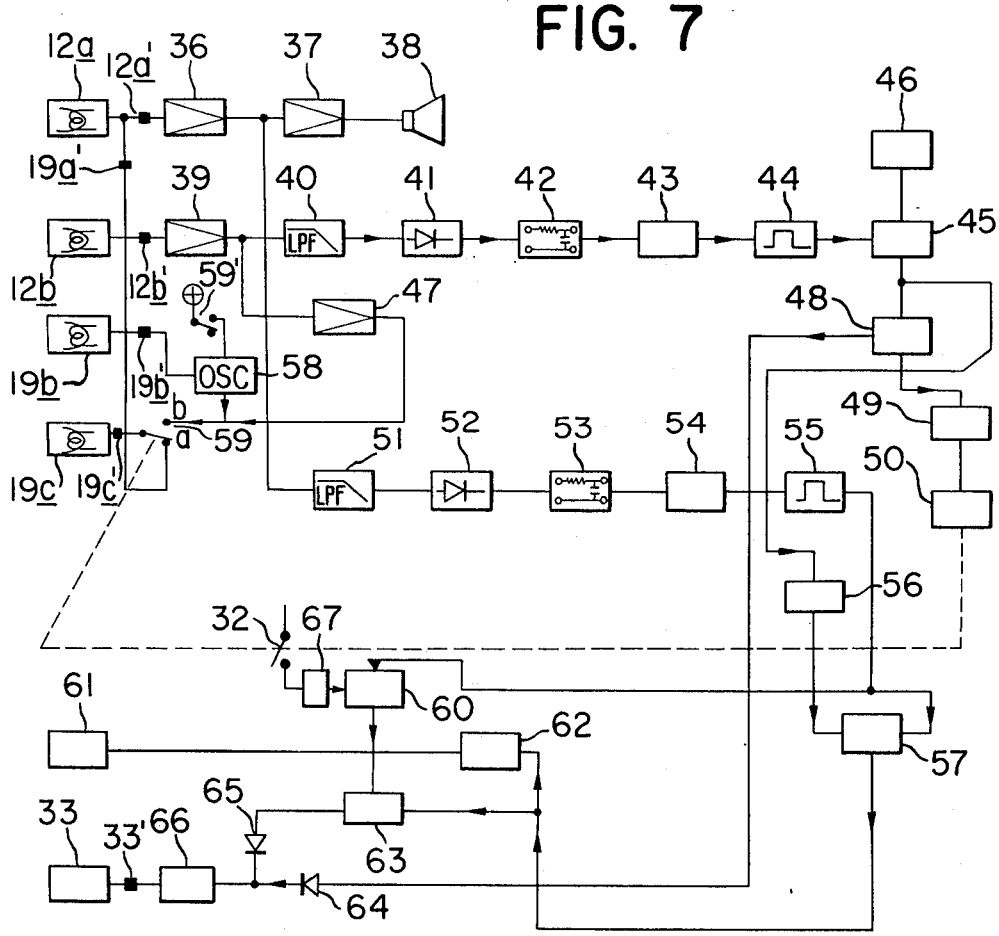
FIG. 7 is a block diagram of the control circuit for controlling a first embodiment of the motion picture projector device and the system therefor according to the present invention.

The coil spring 34 serves to maintain the lever 26 parallel to the back side of the turn table 4 during the unenergized condition of the electromagnet 33 and to permit the connector member 33a attracted by the electromagnet 33 upon energization to restore its original position upon deenergization of the magnet 33. A screw shaft 25 formed with a helical groove is rotatably journalled to the support members 27 and 28 and has a gear 30 mounted on one end portion thereof. A gear 29 rotatably mounted on the support member 27 is in mesh engagement with the gear 30 and receives the rotative drive from an unshown motor to transmit such drive to the gear 30. A support 21 has an adapter member 21a engageable with the helical groove on the screw shaft 25 and holds the speech reproduce head 19 on the other end, and is slidably supported by shafts 22 and 23. The support 21 is designed such that, when the electromagnet 33 is energized by a later-described means to attract and displace the downwardly extending projection 26a of the lever 26, the adapter member 21a cooperates with such displacement to engage the helical groove of the screw shaft 25 while the speech reproduce head 19 bears against the magnetic sheet 18 of the turn table 4, with the support 21 moved toward the outer periphery of the turn table. A spring 24 is provided to return the support 21 to its initial position when the electromagnet 33 has been deenergized to release the engagement between the adapter member 21a of the support 21 and the helical groove of the screw shaft 25. A microswitch 32 is engageable by the support 21 upon its return to the initial position, thereby re-energizing the magnet 33 to reproduce the transferred speech signals on the magnetic sheet 18. FIG. 7 shows the control circuit for controlling the motion picture projector device of the present invention.

In the FIG. 12a' designates a speech information signal generated by the detector member 12a of the speech reproduce head 12 when such detector member 12a has detected the recorded information on the speech information signal recording zone 2b of the film shown in FIG. 1, and 19a' designates a speech information signal generated by the detector member 19a of the speech reproduce head 19 when such detector member had detected the recorded information on the magnetic sheet 18.

12b' is a record information signal generated by the detector member 12b of the speech reproduce head 12 when such detector member has detected the recorded information on the auxiliary speech information signal recording zone 2c of the film 2. 19b' is a signal by which the eraser member 19b of the speech reproduce head 19 erases the recorded information on the magnetic sheet 18. 19c' is a signal by which the recording member 19c of the speech reproduce head 19 records speech record information on the magnetic sheet 18. 33' is a signal for controlling the electromagnet 33. The shown circuit includes an amplifier 36 for amplifying a signal 12a', an amplifier 37 for further amplifying the signal 12a' after it has been amplified by the amplifier 36, and a loud speaker 38 for reproducing sound from the signal $12a'$ amplified by the amplifier 37. There is further provided an amplifier 39 for amplifying the signal $12b'$ a lowpass filter 40 for deriving only the low frequency from the signal $12b'$ amplified by the amplifier 39, a rectifier circuit 41 for rectifying the signal $12b'$ derived by the low-pass filter 40, an integrating circuit 42 for forming the rectified signal $12b'$ into a smooth waveform, a Schmidt circuit 43 for shaping the smoothed waveform $12b'$ into a rectangular waveform, a one-shot circuit 44 for retarding the signal $12b'$ after it has passed through the Schmidt circuit, a flip-flop circuit 45 for switching, a circuit 46 for turning off the output side of the flip-flop circuit upon closing of a power switch, an amplifier 47 for further amplifying the signal $12b'$ applied by the amplifier 39, an oscillation circuit 58 for oscillating the signal $19b'$ by which the eraser member $19b$ of the speech reproduce head 19 erases the recorded information on the magnetic sheet 18 and the bias signal $19c'$ by which the record-reproduce head 19 records on the magnetic sheet, a switching amplifier circuit 48 operable by the output from the flip-flop 45 when the output side of the latter is turned on, a delay circuit 49 for permitting the signal passed through the switching amplifier circuit 48 to be immediately delivered to a relay circuit 50 when the output side of the flip-flop is turned on and to be delivered to the relay circuit with a predetermined time delay when the output side of the flip-flop is turned off, a switch 59 adapted to be short-circuited to its contact $a$ upon closing of the power switch and short-circuited to its contact $b$ upon energization of the relay circuit 50 to permit supply of the signal $19c'$ for transferring the speech record information $2c_3$ on the auxiliary information signal recording zone $2c$, and a switch $59'$ responsive to the switch 59 to operate the oscillator 58 during recording (i.e. transfer).

There is further provided a low-pass filter 51 for deriving only a certain frequency from the signal $12a'$ amplified by the amplifier 36, a rectifier circuit 52 for rectifying the signal $12a'$ derived by the low-pass filter 51, an integrating circuit 53 for forming the rectified signal $12a'$ into a smooth waveform, a Schmidt circuit 54 for shaping the smoothed signal $12a'$ into a rectangular waveform, a one-shot circuit 55 for retarding the signal $12a'$ passed through the Schmidt circuit 54, an inverter circuit 56 for inverting the output signal from the flip-flop circuit 45, a differentiating circuit 67 for delivering a pulse signal for turning on the flip-flop 60 upon closing of the microswitch 32, a flip-flop circuit 60 whose output side is turned off when the microswitch is in its OFF position, a flip-flop circuit 57 whose output side is turned on when the input signal coming in through the inverter circuit 56 is an ON signal, an electromagnet 61 for still projection, switching amplifiers 62 and 63, diodes 64 and 65, and a switching amplifier 66.

Operation of the control circuit will now be described.

When the motion picture projector device is supplied with power, the output side of the flip-flop circuit 45 is turned off by the circuit 46. Since the output side of the flip-flop circuit 45 is thus turned off, the switch 59 is short-circuited to its contact $a$ to deenergize the electromagnets 33 and 61 and thus permit the film 2 to be fed under normal projection mode, and the detector member $12a$ of the speech reproduce head 12 detects the speech information recorded on the normal projection mode speech information recording zone $2b$ of the film 2 and generates the speech information signal $12a'$. Such speech information signal $12a'$ is amplified by the amplifiers 36 and 37 and treated for reproduction by the loud speaker 38.

As the film 2 is fed, the detector member $12b$ of the speech reproduce head 12 detects the signal $2c_1$ on the auxiliary speech information recording zone $2c$ and generates the auxiliary information signal $12b'$. The auxiliary information signal $12b'$ so generated is amplified by the amplifier 39 and passed through the low-pass filter 40, the rectifier circuit 41, the integrating circuit 42, the Schmidt circuit 43 and the one-shot circuit 44 to the flip-flop circuit 45, whose output side is thus turned on to energize the electromagnet 33, which in turn causes the speech reproduce head 19 to bear against the magnetic sheet 18 while, at the same time, the switch 59 is short-circuited to its contact $b$ by the operation of the relay 50. At this time, the electromagnet 61 is not energized because the output side of the flip-flop circuit 57 is turned off. The signal $12b'$ amplified by the amplifier 39 is passed through the amplifier 47 to the transfer head $19c$, and the erase signal $19b'$ and the bias signal $19c'$ are supplied to the erase head $19b$ and the transfer head $19c$, respectively, upon operation of the oscillation circuit 58, so that the eraser member $19b$ of the speech reproduce head 19 erases the old information signal recorded on the magnetic sheet 18 while transferring the speech record information recording zone $2c_3$ from the auxiliary speech information recording zone $2c$ onto the magnetic sheet 18 as such information is reproduced by the speech reproduce head $12b$. When the speech reproduce head $12b$ thus detects the speech record information $2c_3$ and then $2c_2$ on the auxiliary speech information recording zone $2c$, it generates the auxiliary information signal $12b'$. When such signal $12b'$ is generated, the output side of the flip-flop circuit is turned off. This in turn deenergizes the switching amplifier 48, so that the switch 59 is delayed in operation by the delay circuit 49 and when the auxiliary record information $2c_2$ on the auxiliary speech information recording zone $2c$ has been completely transferred onto the magnetic sheet, the switch 59 is short-circuited to the contact $a$ by the operation of the relay circuit 50 to discontinue the oscillation of the oscillation circuit 58 and discontinue the erasing operation of the erase head, whereupon the transfer head $19c$ is changed over from its "record" mode to its "reproduce" mode. Thereupon, the electromagnet 33 is deenergized and, since the inverter circuit 56 is a circuit whose output side is turned on when its input side is turned off, the output side of the flip-flop circuit 57 is turned on. When the electromagnet is deenergized, the support 21, not shown in FIG. 5 holding the speech reproduce head 19 is returned to its initial position by the means previously described, with a result that the support 21 bears against the microswitch 32 to close this switch. Upon closing of the microswitch 32, the output side of the flip-flop circuit 60 is turned on through the differentiating circuit 67 to energize the electromagnets 33 and 61, whereby the film feeding speed of the film feeding mechanism may be varied by such means as disclosed in Japanese Patent Publication No. 4697/1966. When this occurs, the film is being fed at any other speed than that during normal projection mode, but the turn table 4 with the endless film 2 wound thereon is being rotated at the speed equal to the film feeding speed during normal projection mode, and the speech reproduce head 19 is now caused by the aforesaid means to bear against the magnetic disk 18 on the back side of the turn table 4 on which is recorded speech information for some scenes to be projected under non-normal projection mode, so that the head 19 detects the speech information signal $2c_3$ recorded on the magnetic sheet 18 and the so detected signal is reproduced into sound by the loud speaker 38. When the detector member 19a of the speech reproduce head 19 detects the next speech record information $2c_2$ on the same magnetic sheet 18, there is generated the speech information signal 19a', so that the signal 19c' ($2c_2$) passed through the elements 51, 52, 53, 54, 55 turns off the flip-flop 57 while the flip-flop 60 remains in OFF condition, whereby the electromagnet 61 is deenergized to restore the normal projection mode and the electromagnet 33 is also deenergized. Upon deenergization of the electromagnet 33, the speech reproduce head 19 is moved away from the magnetic sheet 18 by the previously described means while, at the same time, the support 21 supporting the speech reproduce head is returned to its initial position. By repetition of the above-described operation, change-over can repetitively occur from the normal projection mode to the non-normal projection mode and vice versa, accompanied by normal sound.

According to the present invention, as has been described hitherto, non-normal projection mode speech information signals are recorded in the balance zone provided along the margin on the perforated side edge of the film so as to correspond to the speech information signal recording zone provided on the opposite side edge of the film, and the speech signal recorded in the balance zone and corresponding to the scene for the next non-normal projection mode is transferred onto the magnetic sheet attached to the turn table rotating at the speed equal to the film feeding speed during the normal projection mode so that the transferred signal on the magnetic sheet may be reproduced when the non-normal projection mode occurs. Thus, normal speech reproduction may be accomplished without the need to provide any accessory equipment and the transfer of the speech signals onto the magnetic sheet occurs before the next non-normal projection mode is entered, which in turn leads to an advantage that the volume of information recorded on the magnetic sheet can be increased.

Figure 8:
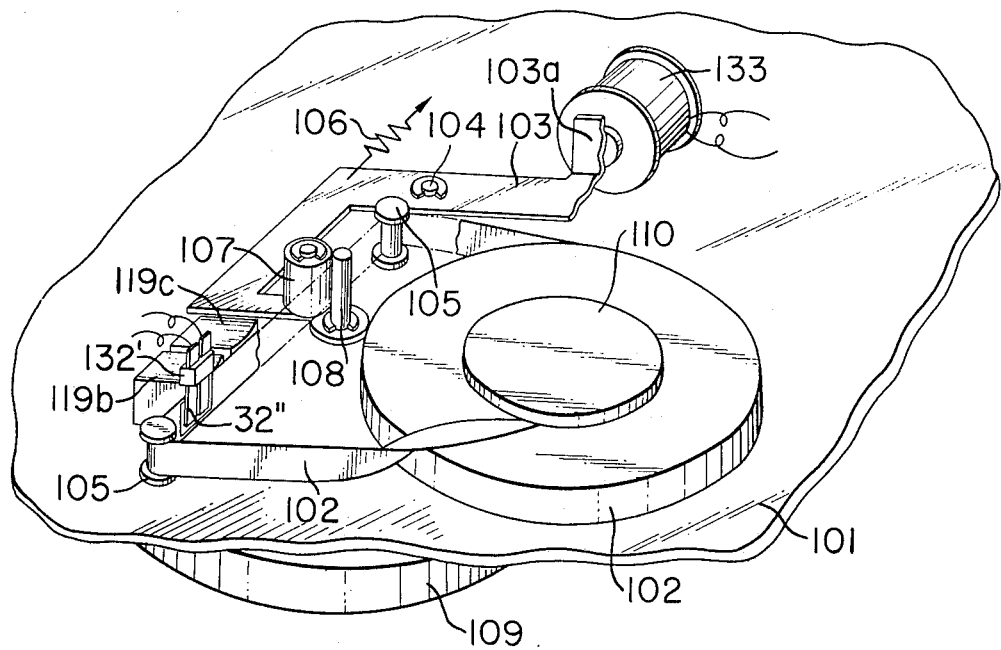
FIG. 8 is a fragmentary perspective view showing essential portions of a second embodiment which is a partial modification of the first embodiment.

FIG. 8 shows a second embodiment of the motion picture projector device and the system therefor which is a modification of the embodiment shown in FIGS. 1 through 7. As compared with the first embodiment wherein the auxiliary speech information used during non-normal projection mode is recorded on the magnetic sheet 18 provided on the back side of the turn table 4 within the endless cartridge, the second embodiment employs, in lieu of the magnetic sheet 18, a second speech record-reproduce mechanism provided within the same device for recording the auxiliary speech information. Such record-reproduce mechanism is shown in FIG. 8. The speech record-reproduce mechanism shown in FIG. 8 is also controlled by the control circuit shown in FIG. 7, and similar reference numerals in FIG. 8 designate the members functionally similar to those in the first embodiment. There is seen a device body 101, a spindle 110 for endless tape 102 movable at a speed equal to that of the turn table 4 within the endless cartridge, and a capstan 108 driven from drive means for driving the turn table 4 within the cartridge. The capstan 108 concentrically mounts thereon a fly-wheel 109 for rotating the capstan at a constant speed. A pivotable member 103 is pivotally supported on a shaft 104 and has an upwardly bent portion 103a at one end thereof. A pinch roller 107 is rotatably mounted on the pivotable member 103 at the other end thereof. The bent portion 103a of the pivotable member 103 serves to pivot the member 103 under the action of the electromagnet 133. By the pivotal movement of the pivotable member 103, the pinch roller 107 is urged toward the capstan 108 to nip the endless tape 102 between the pinch roller 107 and the capstan 108 so that the tape 102 may be fed. The pivotable member 103 is normally biased for clockwise rotation by a tension spring 106. Guide rollers 105 are provided to guide the movement of the endless tape 102.

The endless tape 102, disposed within the so constructed second speech record-reproduce mechanism, is drawn from the inner layer of the wound tape supply and passed over the first guide roller 105, whereafter the tape passes a switch 132, a head 119b, a head 119c and a pad (not shown) and is further guided by the second guide roller 105 so as to wind onto the outer layer of the endless tape supply 102.

Figure 9:
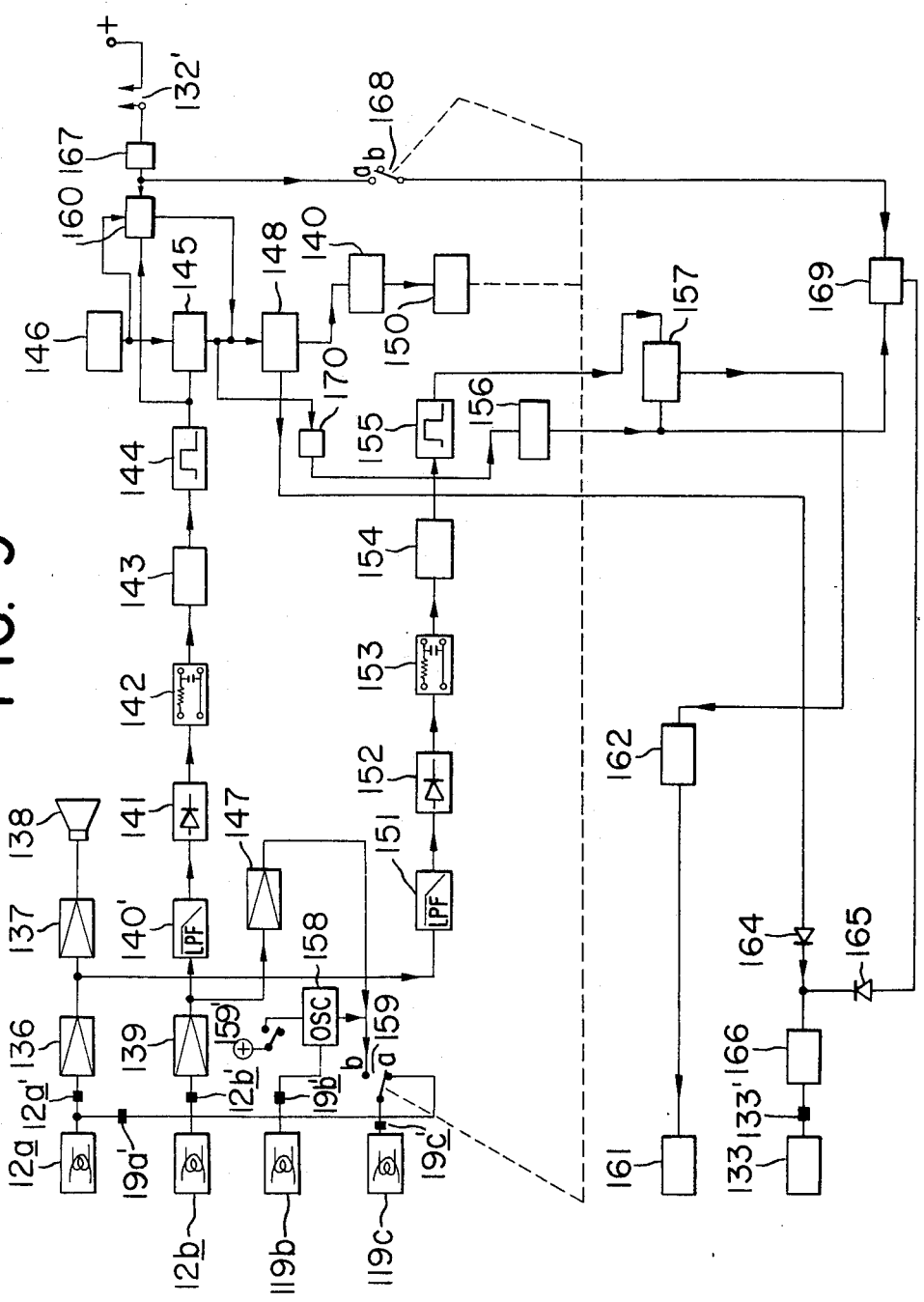
FIG. 9 is a block diagram of the control circuit for controlling the second embodiment shown in FIG. 8.

The second speech record-reproduce mechanism may be operated in the manner described hereinafter under the control of the circuit as shown in FIG. 9, wherein those parts designated by numbers of the order of 100 having two less significant digits similar to those shown in FIG. 7 are functionally similar to those parts shown in FIG. 7.

When the motion picture projector device is supplied with power, a flip-flop circuit 145 and a set-reset flip-flop circuit 160 have their respective output sides turned off by a circuit 146. Since the output side of the flip-flop circuit 145 is thus turned off, the switch 159 is short-circuited to its contact a to deenergize the electromagnets 133 and 161 and thus permit the film 2 (not shown) to be fed under normal projection mode, and the detector member 12a of the speech reproduce head 12 detects the speech information recorded on the normal projection speech information recording zone 2b of the film 2 and generates the speech information signal 12a'. Such speech information signal 12a' is amplified by the amplifiers 136 and 137 treated for reproduction by the loud speaker 138.

As the film 2 is fed, the detector member 12b of the speech reproduce head 12 detects the signal $2c_1$ on the auxiliary speech information recording zone 2c and generates the auxiliary information signal 12b'. The auxiliary information signal 12b' so generated is amplified by the amplifier 139 and passed through the low-pass filter 140', the rectifier circuit 141, the integrating circuit 142, the Schmidt circuit 143 and the one-shot circuit 144 to the flip-flop circuit 145, so that the output side of this flip-flop is turned on and simultaneously, the set-reset flip-flop circuit 160 is turned on. The turn-on of the flip-flop circuit 145 energizes the relay 150 to cause the switches 159 and 168 to be short-circuited to their contact b. Since the flip-flop circuit 157 is maintained in OFF condition by the differentiating circuit 170 and the inverter circuit 156, the electromagnet 161 is not energized, thus permitting the normal projection mode to be continued. On the other hand, the turn-on of the flip-flop 160 results on turn-on of the flip-flop 148 which in turn energizes the electromagnet 133. When so energized, the magnet 133 attracts the bent portion 103a (shown in FIG. 8) of the pivotable member 103 so that the pivotable member 103 is counter-clockwise rotated about the pivot 104. The pivotal movement of the pivotable member 103 urges the pinch roller 107 against the capstan 108 with the endless tape 102 nipped therebetween, whereupon the tape 102 begins to be moved.

The signal $12b'$ amplified by the amplifier 139 is passed through the amplifier 147 to the transfer head 119c, and the erase signal $19b'$ and the bias signal $19c'$ are supplied to the erase head 119b and the transfer head 119c, respectively, upon operation of the oscillation circuit 158, so that the eraser member 119b of the speech reproduce head 19 erases the old information signal recorded on the endless tape 102 while successively transferring the speech record information $2c_1$, $2c_3$, $2c_2$ from the auxiliary speech information recording zone 2c onto the endless tape 102 as such information is reproduced by the speech reproduce head 12b. When the speech reproduce head 12b thus detects the speech record information 2c and then $2c_2$ on the auxiliary speech information recording zone 2c, it generates the auxiliary information signal $12b'$. When such signal $12b'$ is generated, the output side of the flip-flop circuit 145 is turned off. The flip-flop circuit 160 remains in ON condition. When the output side of the flip-flop circuit 145 is turned off, the differentiating circuit 170 generates a waveform of the negative sign which is inverted to a waveform of the positive sign, thus turning on the flip-flop circuit 157. This energizes the electromagnet 161, whereby the film feeding speed of the film feeding mechanism may be varied by such means as disclosed in Japanese Patent Publication No. 4697/1966 while, at the same time, the set-reset flip-flop circuit 169 is turned on. In this manner, the auxiliary speech signals $2c_3$ and $2c_2$ are recorded on the endless tape 102. When a conductor 32" (such as silver paper contact) on the tape 102 closes a switch 132', the set-reset flip-flop circuit 160 is turned off to deenergize the electromagnet 150, thus short-circuiting the switches 159 and 168 to their contacts a. Since the magnet 133 is maintained in energized condition by the flip-flop circuit 169, the auxiliary speech signal $2c_3$ recorded on the endless tape 102 is detected by the head 119c and passed through the pre-amplifier 136 and the main amplifier 137 to the loud speaker 138 for reproduction. The signal $2c_3$ on the tape 102 is thus reproduced and, when the head 119c detects the signal $2c_2$ on the tape 102, the detection signal is passed through the low-pass filter 151, the rectifier circuit 152, the integrating circuit 153, the Schmidt circuit 154 and the one-shot circuit 155 to turn off the flip-flop circuit 157. When the flip-flop circuit 157 is turned off, the electromagnet 161 is deenergized to restore the normal projection mode. The tape 102 continues to travel until the conductor 32" on the tape 102 closes the switch 132', whereupon the set-reset circuit 169 is turned off by the differentiating circuit 167 to deenergize the magnet 133, which thus stops the tape 102 from moving, in the manner described previously. By repetition of the above-described operation, changeover can repetitively occur from the normal projection mode to the non-normal projection mode and vice versa, accompanied by normal sound.

Figure 12:
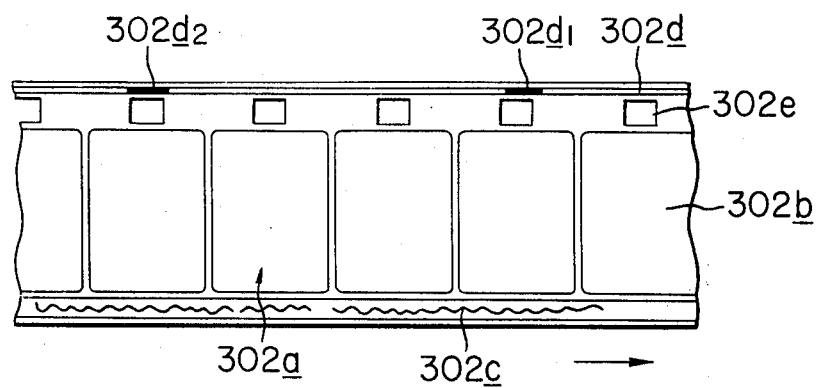
FIG. 12 is a fragmentary plan view of film 302 used with a third embodiment of the motion picture projector device and the system therefor according to the present invention.

Description will now be made of a third embodiment of the motion picture projector device and the system therefor according to the present invention. As is shown in FIG. 12, the endless film 302a employed in the third embodiment includes an image information recording zone 302b divided into a series of frames, a speech information signal recording zone 302c, an auxiliary information signal recording zone 302d, and perforations 302e engageable by a film feed pawl to permit a predetermined amount of the film 302a to be intermittently fed to a film gate portion. Such an endless film 302 may be contained within the cartridge as shown in FIGS. 2, 3 and 4.

The speech information signal recording zone 302c generates the speech information signal $12a'$ with the aid of the speech reproduce head 12a when the film 302a is being projected at a normal feeding speed. The auxiliary speech information signal recording zone 302d generates the speech information signal $12b'$ with the aid of the speech reproduce head 12b to deliver a signal to a control circuit for controlling the film feeding speed.

Figure 13:
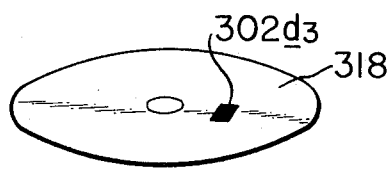
FIG. 13 is a perspective view of a magnetic sheet 318 on which is pre-recorded a signal to be reproduced during the slow motion projection mode or the still projection mode of the motion picture projector device.

A magnetic sheet 318 shown in FIG. 13 with speech information prerecorded therein is attached to that side of the endless cartridge opposite to the side on which the endless film 302a rests.

The speech information signal on the magnetic sheet 318 may be detected by a later-described speech reproduce head 319 during the mode of slow motion projection or still projection, and reproduced during such non-normal projection mode.

Figure 10:
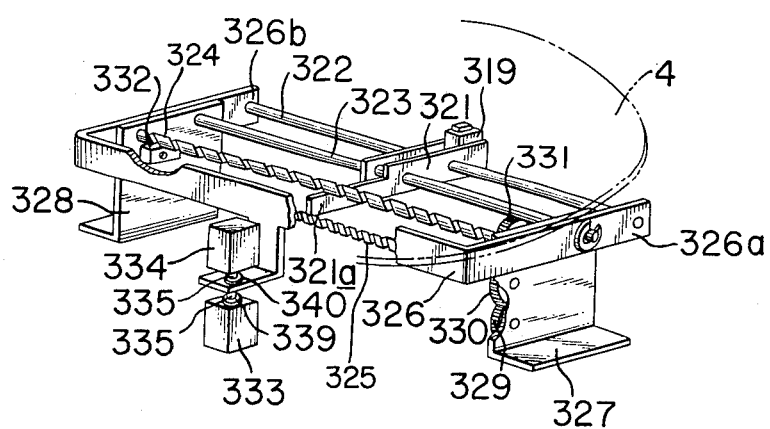
FIG. 10 shows, in perspective view, a mechanism for controlling a reproduce head 319 used with a third embodiment of the present invention, which mechanism is a partial modification of the mechanism shown in FIG. 5.

FIG. 10 schematically shows the mechanism by which the speech reproduce head 319 is caused to bear against the magnetic sheet 318 on the turn table 4 to record speech information in the magnetic sheet 318. The mechanism includes electromagnets 333 and 334 energized by a signal from a later-described means, and plungers 335 supported by the magnets 333 and 334 and vertically displaceable by the attraction of these magnets when energized. Screw shafts 324 and 325 formed with helical grooves have gears 330 and 331 mounted at one end thereof and meshing with each other, and are supported by support members 327 and 328 secured to the projector device. A lever 326 is supported on the support members 327 and 328 for pivotal movement about a shaft 323 and a shaft 322 is journalled to the opposite ends 326a and 326b of the lever 326. The lever 326 has a portion thereof engaged by the opposed ends of the plungers 335 so that said portion of the lever is held between springs 339 and 340 wound around the plungers 335. Thus, the lever 326 is vertically pivotable about the shaft 323 in response to the vertical displacement of the plungers 335 which is caused by the attraction of magnet 333 or 334. A gear 329 is rotatably supported on the support member 327 and may be driven from an unshown motor. The gear 329 is always in mesh engagement with the gear 330 to transmit the rotative drive of the motor to the gears 330 and 331. A support 321 has an adapter member 321a engageable with the helical grooves on the screw shafts 324, 325 and holds the speech reproduce head 319 on the other end, and is slidably supported by shafts 322 and 323. A microswitch 332 is provided to set the magnetic head 319 to its initial condition when the endless film 302 has made one round, as will be described hereinafter.

The speech reproduce head 319 serves to pick up the speech information signal on the magnetic sheet 318 attached to the back side of the turn table 4 so that such speech information signal may be reproduced into sound by a later-described means. The manner in which the speech reproduce head 319 picks up the speech information signal on the magnetic sheet will now be described.

When the signal by which the speech reproduce head 319 can pick up the speech information signal recorded in the magnetic sheet 318 is generated by a later-described means, the film is caused to assume slow motion projection mode or still projection mode by unshown means and simultaneously, the magnet 333 is energized to attract the lever 326. As the lever 326 is so attracted toward the magnet 333, the portion of the lever 326 adjacent the speech reproduce head 319 is upwardly displaced while the portion of the lever 326 adjacent the adapter member 321a is downwardly displaced, with the shaft 323 as the pivot, whereby the speech reproduce head 319 contacts the magnetic sheet 318 while the adapter member 321a engages the helical groove on the screw shaft 325. Since the screw shaft 325 is rotating, the support member 321 having the adapter member 321a now in engagement with the helical groove of the screw shaft 325 is gradually moved toward the outer periphery of the turn table 4 by the rotation of the screw shaft 325 while the speech reproduce head 319 picks up the speech information on the magnetic sheet 318. As will further be described, when the speech reproduce head 312b (not shown) or 319 senses the non-normal projection release signal $302d_2$ on the film or the release signal $302d_3$ on the magnetic sheet, the magnet 333 is deenergized to discontinue the movement of the magnetic head 319, thus permitting the normal projection to occur.

Figure 14A:
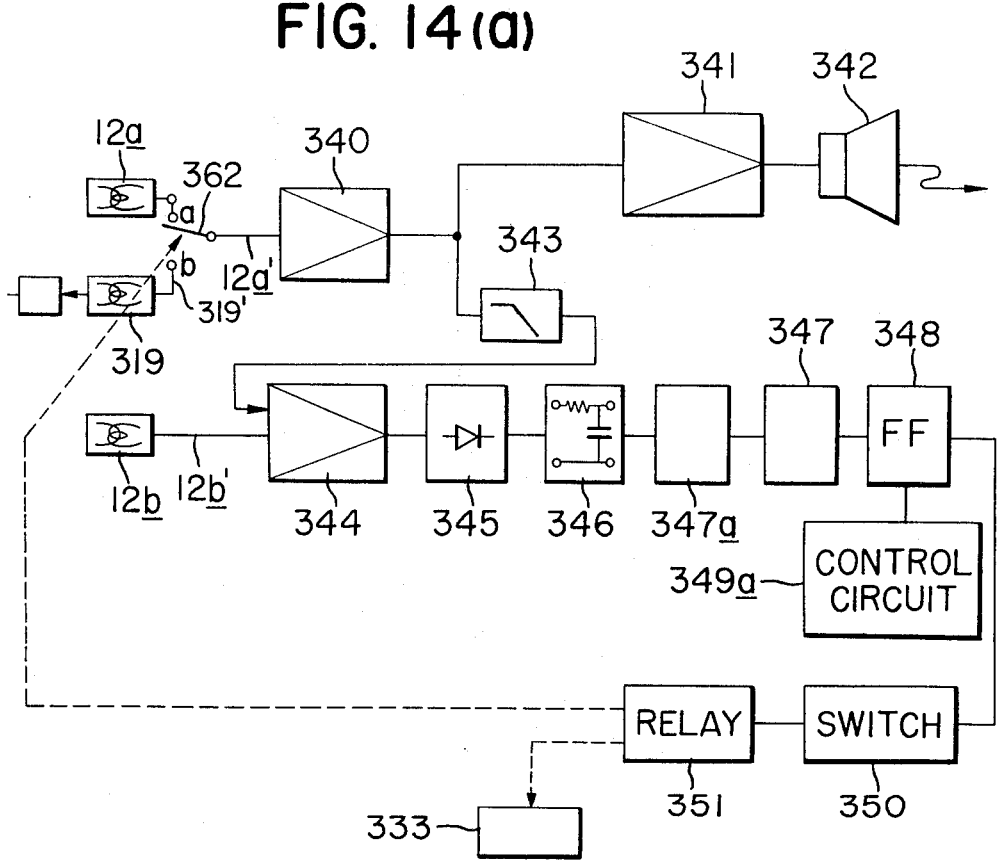
FIGS. 14(a) and 14(b) are block diagrams of the control circuits for controlling the third embodiment of the motion picture projector device and the system therefor according to the present invention and the magnet 334, respectively.
Figure 14B:
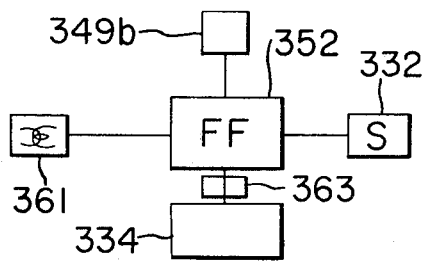

Thereafter, normal projection and non-normal projection are repeated in the manner as described, and when the endless film 302 has made one round, the silver paper detector 361 shown in FIG. 14(b) senses the silver paper attached to the film and the magnet 334 attracts the lever 326. This causes the portion of the lever 326 adjacent the speech reproduce head 319 to be downwardly displaced and the portion of the lever 326 adjacent the adapter member 321a to be upwardly displaced, with the shaft 323 as the pivot, until the adapter member 321a engages the helical groove on the screw shaft 324. Since the screw shaft 324 is being rotated in the direction opposite to the rotational direction of the screw shaft 325, the support 321 having the adapte 321a engaged with the helical groove on the screw shaft 324 is quickly moved toward the spindle 4a (shown in FIG. 2) by the rotation of the screw shaft 324 to assume the initial position, in which the support 321 bears against the microswitch 332, whereby the magnet 334 is deenergized to stop the support 321. Engagement and disengagement between the adapter member 321a of the support 321 and the helical groove on the screw shaft 325 or 324 may be caused to occur at any desired position by energizing or deenergizing the magnets 333 and 334.

FIG. 14 shows the control circuit for controlling the motion picture projector device and the system therefor according to the third embodiment of the present invention. In the figure, 12a' is the speech information signal generated by the speech reproduce head 12a from the speech information recording zone 302c in the film 302a shown in FIG. 12, and 12b' is the speech information signal generated by the speech reproduce head 12b for the auxiliary speech information recording zone 302d in the same film 302a. The control circuit includes a change-over switch 362 controlled by a later-described means, a preamplifier 340 for amplifying the speech information signal 12a' or 319' selected by the switch 362, a main amplifier 341 for further amplifying the speech information signal after it has been amplified by the preamplifier 340, a loud speaker 342 for reproducing sound from the speech information signal amplified by the main amplifier, and a low-pass filter 343 for deriving only a certain frequency from the speech information signal amplified by the preamplifier. The control circuit further includes a preamplifier 344 for amplifying the speech information signal 12b' and the speech information signal passed from the low-pass filter 343, a rectifier circuit 345 for rectifying the speech information signal amplified by the preamplifier 344, an integrating circuit 346 for forming the speech information signal provided by the rectifier circuit into a smooth waveform, a Schmidt circuit 347a for further shaping the waveform signal from the integrating circuit, a one-shot circuit 347 for retarding the signal provided by the Schmidt circuit 347a, a switching flip-flop circuit 348, a control circuit 349a for turning on one of the input and output sides of the flip-flop circuit upon closing of the main switch, a switching amplifier circuit 350 for amplifying the signal provided by the flip-flop circuit, and a relay circuit for relaying the signal from the switching amplifier circuit to the magnet 333 and switch 362. The switch 362 is adapted to be normally short-circuited to its contact a upon supply of power to the projector device.

FIG. 14(b) shows a circuit for controlling the magnet 334. It includes a flip-flop circuit 352, and a control circuit 349b for turning off the flip-flop circuit 352 to disconnect the switching circuit 363 upon closing of the main switch. The numeral 332 designates a limit switch for controlling the support 321, and the numeral 361 designates the silver paper detector already described.

Operation of such control circuit will now be described. When the motion picture projector device is supplied with power, the switch 362 is short-circuited to its contact a by the operation of the flip-flop 352 and the circuit 349a. During normal projection, the speech reproduce head 12a scans the speech information signal recording zone 302c of the film 302a while the speech reproduce head 12b scans the auxiliary speech information signal recording zone 302d of the film 302a, and the head 12a picks up the speech information signal on the speech information signal recording zone 302c of the film 302a to generate the speech information signal 12a' therefrom. The speech information signal 12a' is amplified through the preamplifier 340 and the main amplifier 341 and reproduced by the loud speaker 342.

Although the speech reproduce head 12b is scanning the auxiliary speech information recording zone 302d of the film 302a, there is no signal generated in the blank areas of such zone and thus, the speech information 12a' provided by the speech reproduce head 12a is continuously treated in the manner previously described. On the other hand, as the speech reproduce head 12b continues to scan the auxiliary speech information recording zone 302d to pick up auxiliary speech information $302d_1$, the film feeding mechanism is controlled by an unshown conventional film feeding speed control means in accordance with the signal of said auxiliary speech information $302d_1$ (sine wave signal or the like) to effect slow motion projection. When the speech information 12b' is generated, the signal of such information is passed through the preamplifier 344, the rectifier circuit 345, the integrating circuit 346, the Schmidt circuit 347a and the one-shot circuit 347 to the flip-flop circuit 348, the output side of which is thus turned on. The turn-on of the output side of the flip-flop 348 permits power supply to the switching amplifier circuit 350 and to the relay circuit 351. When the relay circuit 351 is energized, the switch 362 is short-circuited to its contact b to energize the magnet 333. Upon energization of the magnet 333, the speech reproduce head 319 is caused to bear against the magnetic sheet 318 by the operation previously described, and reads the speech information signal pre-recorded on the magnetic sheet to generate the speech information signal 12a', which is thereafter treated in the same manner as described above.

The film 302a is fed on at a slow speed and when the speech reproduce head 12b picks up the auxiliary speech signal $302d_2$ as shown in FIG. 12, the film feeding speed of the film feeding mechanism is caused to restore the normal projection level by an unshown means and simultaneously, the switch 362 is again short-circuited to its contact a so that the speech reproduce head 12a generates a speech signal while the output side of the flip-flop 348 is turned off to deenergize the magnet 333, which thus releases the engagement between the speech reproduce head 319 and the magnetic sheet 318.

When the endless film 302a has made one round with the described operation repeated, the silver paper detector 361 senses the silver paper attached to the film to turn on the flip-flop circuit 352 and energize the magnet 334 through the switching amplifier 363. Upon energization of the magnet 334, the support 321 is returned toward the spindle by the described operation and at the end of such stroke, the support 321 contacts the microswitch 332 to turn off the flip-flop 352 and deenergize the magnet 334, whereby the support 321 is set to its initial position.

The foregoing description has been made of an embodiment in which the speech reproduce head 12b scans the auxiliary speech information signal recording zone 302d of the film 302a to generate a signal from such zone so that the signal is used to effect change-over from normal projection mode to slow motion projection mode and vice versa. Changeover between normal projection mode and still projection mode may be achieved by setting the device so that the speech reproduce head 12b scans the auxiliary speech information signal recording zone 302d of the film 302a to generate a signal from such zone and that, when the signal generated from the auxiliary speech information signal recording zone 302d has been transmitted to the circuit for controlling the feeding speed of the film feeding mechanism, a conventional film feeding speed control means stops the film feed and later releases the film.

A fourth embodiment which provides a signal for controlling the feeding speed of the film feeding mechansim will now be described. The fourth embodiment employs a control signal $302d_3$ provided on the magnetic sheet 318, as shown in FIG. 13.

The control signal $302d_3$ on the magnetic sheet 318 is a sine wave signal of different wavelength from the speech signal as normally picked up by the speech reproduce head 319 and reproduced by the loud speaker 342. The control signal $302d_3$, as soon as detected by the speech reproduce head 319, is passed to the preamplifier 340 and main amplifier 341 for the speech information 12b' and also to the circuit for controlling the feeding speed of the film feeding mechanism, thereby controlling the film feeding speed with the aid of the conventional film feeding speed control means.

The speech reproduce head 12a scans the speech information recording zone 302b and the speech reproduce head 12b scans the auxiliary speech information recording zone 302d, and when the latter head 12b detects the auxiliary speech information $302d_1$ on the auxiliary speech information recording zone 302d, the film feeding speed of the film feeding mechanism is controlled by the signal of that auxiliary speech information $301d_1$ to permit still projection and simultaneously, the signal of the speech information 12b' is generated. Upon generation of such signal 12b', the speech reproduce head 319 bears against the magnetic sheet 318 in the described manner and reads the speech signal recorded on the magnetic sheet 318 to generate the speech information signal 12b', which is then treated in the same manner as described. The feeding of the film 302a has been stopped by that time, but the turn table 4 mounting thereon the coiled film 302 slips relative to the film 302 and the turn table alone is in constant rotation. The speech reproduce head 319 slidably scans the magnetic sheet 318 and when it reads the control signal $302d_3$ recorded on the magnetic sheet, the magnet 333 is deenergized by the described operation to release the contact between the speech reproduce head 319 and the magnetic sheet 318, whereby the film feeding mechanism restores its normal feeding speed. Change-over from normal projection mode to slow motion projection mode or vice versa may also be accomplished in the same manner as described in connection with the third embodiment, that is, by setting the device so that, when the control signal $301d_3$ recorded on the magnetic sheet 318 and generated by the speech reproduce head 319 has been transmitted to the circuit for controlling the feeding speed of the film feeding mechanism, the contioanl film feeding speed control means effects the change-over of the film feeding speed to the slow motion speed and later release such speed.

When the endless tape 302a has made one round through the repetition of the described operation, the silver paper attached to the film to invert the flip-flop circuit 352 and turn on the output side of this flip-flop to energize the magnet 334 through the switching amplifier 363, whereby the support 321 restores its initial position in the described manner.

According to the present invention, as has been described above, a signal is recorded at a suitable position on the endless film so that when the speech reproduce head reaches that position it reads the signal to automatically bring about the still projection or slow motion projection mode while the speech signal to be reproduced into sound may be provided from the magnetic sheet attached to the turn table which is rotating, independently of the projection mode, at a constant speed equal to the speed at which the film is fed during normal projection mode. Moreover, the reproduction of the speech signal is effected by the mechanism common with the mechanism for treating the speech signal 302b on the speech information signal recording zone during normal projection mode, and this ensures good tone quality irrespective of any change in the film feeding speed which would occur when still or slow motion projection mode is entered at a predetermined scene of the film being projected. In addition, all the speech signals are changed into sound by a common mechanism and this eliminates the need to provide a separate sound generator for use during still projection mode and slow motion projection mode, which in turn leads to a great reduction in cost.

With the present embodiment, not all of the four types of change-over, i.e. from normal projection mode to slow motion projection mode or to still projection mode and from slow motion projection mode or still projection mode to normal projection mode can be achieved, whereas all these may become possible by providing a circuit for comparing the signals generate from the auxiliary speech information signal recording zone 302d.

Figure 11:
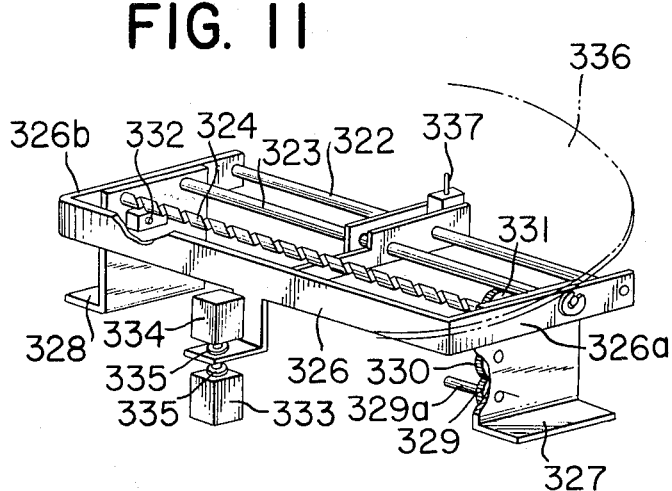
FIG. 11 shows a further modification of the mechanism of FIG. 10.

Further, FIG. 11 shows an embodiment which employs a record stylus 337 instead of the head 319 shown in FIG. 10, and this embodiment is identical in operation with the embodiment of FIG. 10.

We claim as our invention:

1. An audio-visual system for reproducing a strip of cinematographic film provided with an image information zone, along which a first image information, for motion projection, and a second image information, for still projection, are recorded in succession, and along which there are provided a first sound signal zone corresponding to said first image information, a second sound signal zone corresponding to said second image information, a transfer instruction signal zone, and a mode change-over signal zone, said system comprising in combination:
a. signal recording means having;
   1. a sound signal recording medium and means for moving said recording medium continuously at a substantially constant speed; and
   2. first transducing head means arranged to record a sound signal onto said sound signal recording medium, and of converting the thus recorded sound signal into an electrical signal;
b. film feeding means capable of feeding said film in a motion projection mode, and of temporarily stopping the film feeding for a still projection mode;
c. sound signal information reproducing means; and
d. a control device having;
   1. second transducing head means for detecting a first sound signal along said first sound signal zone of said film and for directing the thus detected sound signal into said sound signal information reproducing means;
   2. third transducing head means for detecting in sequence during movement of said film, a transfer instruction signal in said transfer instruction signal zone, a second sound signal in said second sound signal zone, and a mode change-over signal in said mode change-over signal zone; and
   3. control means electrically connected to said first and third transducing head means, and said film feeding means to control the operations of said transducing head means and said film feeding means,
said control means being operative in response to said transfer instruction signal from said third transducing head means to cause the second sound signal and said mode changeover signal detected by said third transducing head means to be recorded onto said recording medium via said first transducing head means,
said control means also being operative in response to the detection of said mode change-over signal by said third transducing head means to control said film feeding means to stop the film feeding for said still projection mode and for simultaneously causing the signal recorded on said recording medium to be detected by said first transducing head means and for the thus detected signal to be directed through said sound signal reproducing means, and said control means further being operative in response to the detection, by said first transducing head means, of said mode change-over signal recorded on said recording medium to return said film feeding means to its motion projection mode.

2. The audio-visual system as defined in claim 1, wherein said second transducing head means is provided with a magnetic head member which contacts a main track, along which said first sound signal is recorded.

3. The audio-visual system as defined in claim 1, wherein said film is mounted and disposed on a turn table accommodated in a film cartridge and arranged for continuous rotation at a substantially regular speed, and is formed in an endless loop coiled about the center of said turn table in such a manner that after each portion of said film is fed from the coiled region thereof to a projection position, it is again coiled about the central portion of the same turn table, and wherein said recording medium is fixedly secured to one rotating surface of said turn table.

4. The audio-visual system defined in claim 3, wherein said first transducing head means is provided with a magnetic head member and mounting means for said head operable to move said head member in the radial direction with respect to the center of rotation of said turn table, while maintaining said head member in contact with said recording medium.

5. The audio-visual system defined in claim 4, wherein said mounting means includes resetting means operable to return said head member to its initial starting point on said recording medium.

6. An audio-visual system for use with a strip of film having an image information zone, along which there is provided a first image information for motion projection and a second image information for still projection, and along which there are further provided, a first sound signal zone corresponding to said first image information, and a first mode changeover signal zone for said still projection mode, said system comprising in combination:
a. an auxiliary sound signal accommodating device having:
   1. a sound signal recording medium and means for moving said recording medium continuously at substantially constant speed, said sound signal recording medium being provided with a second sound signal zone, corresponding to said second image information, and a second mode change-over signal zone located substantially at the terminal end of said second sound signal zone, for instructing the motion projection mode; and
   2. first transducing head means arranged to detect a second sound signal along the second signal zone of said signal recording medium and to convert the same into an electrical signal;
b. film feeding means capable of feeding said film in a motion projection mode and of temporarily stopping the film feeding operation for a still projection mode;
c. sound signal information reproducing means;
d. a control device having:

1. second transducing head means for detecting signals along said signal zones of said film; and
2. control means electrically connected to said first and second transducing head means, and to said film feeding means, said control means being operative in response to the detection of a first mode change-over signal along the first mode change-over signal zone of said film by said second transducing head means to stop the film feeding for said still projection zone and at the same time to cause said first transducing head means to detect said signals on said signal recording medium and to direct the thus detected signals through said sound information recording means, and said control means also being operative in response to the detection of said second mode change-over signal on said recording medium by said first transducing head means to return said film feeding means to its motion projection mode; and e. first transducing head mounting means arranged to move said first transducing head means from an initial position to a second position on said recording medium during recording onto said recording medium, said mounting means including reset means responsive to each occurrence of said mode change-over signal to reset said first transducing head means to its said initial position.

7. The audio-visual system as defined in claim 6, wherein said first transducing head means is provided with a head member and mounting means operable to maintain said head memger in contact with said signal recording medium which is rotated at a substantially regular speed, said mounting means further being operable to continuously displace said head member in the radial direction with respect to the center of rotation of said recording medium.

* * * * *

UNITED STATES PATENT AND TRADEMARK OFFICE
CERTIFICATE OF CORRECTION

PATENT NO. : 3,981,570
DATED : September 21, 1976
INVENTOR(S) : AKIRA ASHIDA, ET AL.

It is certified that error appears in the above-identified patent and that said Letters Patent are hereby corrected as shown below:

Column 3, lines 27-28, delete --and the magnet 334, respectively--.

Column 4, line 10, change "comprise" to --comprises--.

line 66, change "inlet $1\underline{j}$" to --inlet $1\underline{j}'$--.

Column 10, line 22, change "switch 132" to --switch 132'--.

Column 13, line 45, change "adapte" to --adapter--.

line 64, change "for" to --from--.

Column 16, line 13, change "information $301d_1$" to --information $302d_1$--.

line 36, change "signal $301d_3$" to --signal $302d_3$--.

UNITED STATES PATENT OFFICE
CERTIFICATE OF CORRECTION

Patent No. 3,981,570  Dated September 21, 1976

Inventor(s) AKIRA ASHIDA, ET AL.  Page 2 of 2

It is certified that error appears in the above-identified patent and that said Letters Patent are hereby corrected as shown below:

Figure 2, extend the lead line from reference numeral 18 to indicate a magnetic sheet below the turntable 4 at the center of the figure.

Signed and Sealed this

Thirty-first Day of May 1977

[SEAL]

Attest:

RUTH C. MASON
Attesting Officer

C. MARSHALL DANN
Commissioner of Patents and Trademarks